3,272,713
ACTINIC RADIATION PROTECTION BY COMPOSITIONS COMPRISING QUINONES AND CARBONYL CONTAINING COMPOUNDS
Walter J. Runge, St. Paul, Minn., assignor to The Regents of the University of Minnesota, Minneapolis, Minn., a corporation of Minnesota
No Drawing. Filed June 15, 1962, Ser. No. 202,674
16 Claims. (Cl. 167—90)

This application is a continuation-in-part of Serial No. 126,899 filed on July 26, 1961, which is now abandoned.

This invention relates to a material and method useful primarily for shielding the human skin from light to protect the skin from the effects of actinic radiations such as sunlight and the like of wavelengths between about 2900 and 26,850 angstroms. The skin of virtually all persons is sensitive to sunlight to some degree. Many people are extremely sensitive to the extent that they must severely restrict or control their exposure to bright sunlight. The present invention affords a simple and effective means for protecting all persons from the painful effects of overexposure to sunlight. To persons of extreme light sensitivity, the present invention offers a means toward near-normal livelihood.

Broadly stated, the light shield producing material of the present invention comprises a mixture of a benzo- or naphtho-quinone, and more particularly alpha and beta tautomers of benzo- and naphtho-quinones and their derivatives capable of 1,4 additions, in compatible solution with carbonyl containing compounds which are reactive with amino derivatives of protein to form melanoidins and applied to the skin, as a lotion or admixed in a cream base. Exemplary operable quinones include juglone (5-(8)-hydroxy-1,4-naphthoquinone; $C_{10}H_6O_3$);
menadione (2-methyl-1,4-naphthoquinone, $C_{11}H_8O_2$);
henna (2-hydroxy-1,4-naphthoquinone);
2,6-dimethoxy benzoquinone;
2,5-dimethylquinone;
2,5-dihydroxy-3-undecyl-1,4-benzoquinone;
2-hydroxy-3-methyl-1,4-naphthoquinone;
3,5,8-trihydroxy-2-methyl-1,4-naphthoquinone; and
2-hydroxy-3-isobutyl-1,4-naphthoquinone.

For aesthetic reasons crystalline juglone is a preferred material and for convenience the invention will be described with specific reference to juglone. The invention, however, is not limited to use of juglone. The statements made with respect to juglone are applicable to the other quinones. The quinones may be used singly or in admixture with one another.

Exemplary operable carbonyl compounds include dihydroxyacetone (DHA); 5-(hydroxymethyl)-2-furaldehyde (HMF); pyruvic aldehyde; glyceraldehyde; alloxan and monohydroxyacetone (Acetol). These compounds are all reactive with amino derivatives of protein, as present in the human skin, to form melanoidins. They are readily polymerizable. They are tolerable to the skin in that upon application they do not normally cause undue discomfort arising from erythema, itching, burning, etc. For convenience the invention will be described with particular reference to dihydroxyacetone. The invention, however, is not so limited. The carbonyl containing compounds may be used singly or in admixture with one another.

Juglone by itself is known to produce colored reaction products with skin and keratin and is used as a hair coloring agent. Dihydroxyacetone by itself is also known to produce a tan color in certain organic materials and is the main constituent of commercial artificial suntan lotions. (U.S. Patent No. 2,949,403.) Neither juglone alone nor dihydroxyacetone alone has any appreciable protective effect against actinic burns.

The combination of a quinone and carbonyl containing compound in a suitable solvent does not produce a mere additive effect. As evidence of this, juglone by itself is an effective coloring agent for skin, but the coloration of skin with juglone can be inhibited by mercurous chloride. Similarly, the pigmentation of skin by dihydroxyacetone can be blocked completely with formaldehyde. The tanning of skin by the mixture of juglone and dihydroxyacetone, however, is not blocked by mercurous chloride and formaldehyde.

Wide variations in concentration of the ingredients comprising the protective material are possible. The quinone may be present in the final solution in concentration from about 0.001% to saturation and the carbonyl containing compound may be present in concentrations from about 1% to saturation. In the case of dilute preparations, more frequent application to the skin is necessary to produce and maintain the desired protective effect. The light shield producing material may be prepared in any compatible non-irritating solvent which is capable of maintaining both compounds in solution. Juglone is slightly soluble in hot water, freely soluble in chloroform and benzene, soluble in methanol, ethanol and other alcohols, in acetone and ether and the like. Dihydroxyacetone is soluble in water, alcohols, ketones such as acetone, and ethers, etc. Exemplary solvents capable of maintaining both compounds in solution include $C_1$ through $C_{10}$ alcohols ranging from dilute alcohols to absolute, ethers, acetone, glycerin, water, etc.

The final solution may have a pH ranging from acid to slightly above neutral. The effectiveness of the light shield producing material is independent of pH but the material becomes less stable above pH 7.2. Preferably, the solution pH range is between about 4.2 and 5, which approximates the normal pH of skin.

The quinone and carbonyl containing compound are preferably first separately dissolved and then admixed. Where the final solution includes a water-containing alcohol, the solution should desirably be stored in a cool dark place for about five days before use in order to give color stability to the product. This is due to complexing of some quinones in water-containing alcohols which causes a color change.

The quinone and carbonyl containing compound may be present in the relative proportions of between about 0.05:100 and 20:100 and preferably in the proportions of about 0.5 to 10 parts quinone to each 100 parts of carbonyl containing compound. The optimum proportion to produce the desired effect on human skin is about 1:100.

The combined solution of the quinone and carbonyl containing compound may be applied directly to the skin as a lotion or it may be admixed with a hydrophilic cream base and applied as a cream or ointment. Non-oxidizing or reducing compounds, such as vitamins or hormones or the like, may be admixed without adverse effect upon the light shielding reaction of the materials with the skin.

The lotion is painted or sprayed or rubbed on the areas to be protected. Preferably, from about 3 to 6 coatings, applied at least 45 minutes apart, are used and desirably the protection is renewed every other day in the evening by the application of an additional coating. The light shield producing material functions by reacting with the skin surface. In order to allow time for the action to proceed, the skin should not be washed for at least 1½ hours after application of the protective solution.

When the shielding material is prepared as a cream, any of the common readily available proprietary toilet or cosmetic or medicinal cream bases, including synthetic cream bases, may be used so long as they emulgate the solutions of quinone and carbonyl containing compound in the selected solvents. The protective cream or ointment is rubbed in thoroughly one or more times daily in order to permit the reaction to proceed at the skin surface. Water should not be applied for at least two hours after application.

Although the manner in which the reactions with the skin occur and protection is imparted to the skin surface is not fully understood, it is known that the reaction involves sulphur-hydrogen groups present in the cornified layer of skin. It is believed that the intense ultraviolet absorption of the reaction product between the skin and the protective solution may be related to the occurrence of sulphur addition to the naphthoquinone ring, probably in positions 2 and 3. The color reaction of the solution of a quinone and carbonyl containing compound with the skin may be intensified by pretreating the skin with a substance, such as solutions of thioglycolic acid and its salts, which functions to free sulphur-to-sulphur bonds in the skin to produce larger numbers of sulphur-hydrogen groups in the skin. The same effect may be obtained by incorporating the color intensifying material directly in the protective light shield producing material.

The application of the juglone-dihydroxyacetone containing mixture to the skin produces a brown, yellow tan resembling normal suntan. This color reaction creates an effective epidermal optical filter which, as part of the skin itself, cannot be removed easily by water, washing with soap, and mild mechanical abrasion. The solvent evaporates to leave a thin oily film to react with the skin.

The spectral transmission characteristics of the color layer produced by reaction of the juglone-dihydroxyacetone mixture are significantly different from coloration obtained by either juglone or dihydroxyacetone alone, as studied by absorption measurements by spectrophotometric means of the cornified layer of skin after application of the compounds. The spectral transmission of the skin colorations is furthermore quite different from the transmission of the juglone-dihydroxyacetone mixture in solution, and either compound alone in solution.

The percentage of light transmitted through a cornified layer of skin treated respectively with a juglone-dihydroxyacetone solution and solutions of both compounds alone as compared with untreated skin is shown in Table I. The table illustrates that within the sunburn spectral range (2900 A. to 3200 A.) the light transmission of skin colored by reaction with juglone-dihydroxyacetone solution is less than 5% of the available energy. For example, at 3000 A. the normal untreated skin layer transmitted 75% of the light; that treated with dihydroxyacetone solution transmitted 58%; and that treated with juglone solution transmitted 70% of the available light. In contrast, the transmission of light through the skin treated with the juglone-dihydroxyacetone combined solution was only 1%.

TABLE I.—TRANSMISSION OF LIGHT IN PERCENT THROUGH CORNIFIED LAYER OF SKIN

| Wave Lengths | Treated with Juglone and Dihydroxy-acetone | Normal (Untreated) | Treated with Dihydroxy-acetone | Treated with Juglone [1] |
|---|---|---|---|---|
| 26,850 [2] | 80 | 100 | 86 | 97 |
| 5,000 | 7 | 48 | 45 | 48 |
| 4,000 | 2 | 44 | 42 | 44 |
| 3,600 [3] | 12 | 100 | 82 | [1] 100 |
| 3,200 | 4 | 87 | 65 | 85 |
| 3,150 | 3 | 83 | 62 | 77 |
| 3,000 | 1 | 75 | 58 | 70 |
| 2,900 | 0 | 50 | 40 | 40 |

[1] Juglone treatment only ½ the treatment of combined solution and dihydroxyacetone alone.
[2] Values obtained as T 26,850—100%.
[3] Values obtained as T 3,600—100%.

A washable light shield producing material may be produced by reacting a solution of a quinone and carbonyl containing compound solution with a sulphur containing amino acid or sulphydryl-containing compound or certain basic amino acids prior to application of the solution to the skin. Exemplary additive materials include glutathione, cystine, cysteine, methionine and arginine. When these materials are used, the color reaction takes place between the solution of quinone and carbonyl containing compound and the sulphur-containing compound before application of the material to the skin. This resulting brownish colored product is applied to the skin in the form of a cream or lotion. While it gives protection against ultraviolet light, it is removable with water, soap, mild organic solvents and abrasion, but may be used where more long lasting coloration of the skin is not desired.

The preparation and composition of the protective light shield producing materials of the present invention are further illustrated by the following examples.

*Example 1*

A protective lotion is prepared by dissolving 0.35 part by weight of chemically pure grade crystalline juglone in 156 parts by weight (200 parts by volume) of absolute isopropanol heated to a boil. After cooling, this solution is mixed in a brown bottle with a solution of 30 parts by weight of dihydroxyacetone (C.P.; melting point 81–82° C.) in 300 parts by weight of distilled water and 394 parts by weight (500 parts by volume) of absolute isopropanol. The volume is restored to 1,000 parts by addition of isopropanol. The ingredients are thoroughly admixed to insure solution. The mixture is then set aside for five days until it becomes color stable. The pH is adjusted to between 4.2 to 4.9 by addition of acetic acid. The final concentration of the lotion is juglone 0.035% and dihydroxyacetone 3%, in isopropanol 70% (by volume).

*Example 2*

A cream light shield producing material is prepared by dissolving 0.35 part by weight of juglone in 200 parts by weight (250 parts by volume) of absolute ethyl alcohol. A second solution composed of 30 parts by weight of dihydroxyacetone in 250 parts by weight of distilled water is prepared and emulgated with 500 parts of weight of "Aquaphor," a proprietary hydrophilic cream base. The previously prepared juglone solution is added and the mixture is once more emulgated thoroughly. It is stored in a cool, dark place and is ready for application after five days. The final concentration of the cream preparation is juglone 0.035%, dihydroxyacetone 3%, ethanol 50% (by volume) and cream base 50%.

*Examples 3 to 20*

The following examples illustrate varying proportions of juglone relative to dihydroxyacetone and varying concentrations of these materials in various solvents. Each of these exemplary solutions is applied to the skin as a lotion. In each instance, juglone and dihydroxyacetone are shown in grams per liter of solution. The proportions of solvent are shown in volume percentages. In each instance, the solvent was compatible to maintain both the juglone and the dihydroxyacetone in solution. The examples are summarized in the table:

TABLE II

| Example No. | Juglone (Grams/Liter) | Dihydroxy-acetone (Grams/Liter) | Juglone/DHA Ratio | Solvent | Volume, Percent |
|---|---|---|---|---|---|
| 3 | 4 | 40 | 10:100 | Isopropanol / Water | 60 / 40 |
| 4 | 0.01 | 20 | 0.05:100 | Isopropanol / Water | 20 / 80 |
| 5 | 4 | 40 | 10:100 | Ethanol / Water | 50 / 50 |
| 6 | 0.01 | 20 | 0.05:100 | Ethanol / Water | 20 / 80 |
| 7 | 5 | 30 | 16.7:100 | Acetone / Water | 80 / 20 |
| 8 | 0.2 | 300 | 0.067:100 | Acetone / Water | 20 / 80 |
| 9 | 4 | 40 | 10:100 | Methanol / Water | 50 / 50 |
| 10 | 0.3 | 30 | 1:100 | Chloroform / Methanol | 20 / 80 |
| 11 | 1 | 40 | 2.5:100 | n-Butanol / Ethanol / Water | 50 / 30 / 20 |
| 12 | 0.3 | 30 | 1:100 | Glycerol / Ethanol / Water | 50 / 30 / 20 |
| 13 | 0.4 | 25 | 1.6:100 | Glycerol / Isopropanol / Water | 30 / 30 / 40 |
| 14 | 0.3 | 30 | 1:100 | Ethyl Ether | 100 |
| 15 | 0.6 | 30 | 2:100 | Water saturated Ethyl Ether | 100 |
| 16 | 0.9 | 50 | 1.8:100 | Ethyl Ether / Isopropanol / Water | 20 / 10 / 70 |
| 17 | 0.35 | 30 | 1.17:100 | Acetone / Isopropanol / Ethanol / Water | 10 / 20 / 5 / 65 |
| 18 | 0.7 | 100 | 0.7:100 | n-Amyl Alcohol / Isopropanol / Water | 5 / 55 / 40 |
| 19 | 0.5 | 15 | 3.3:100 | Benzyl Alcohol / Isopropanol / Water | 10 / 70 / 20 |
| 20 | 0.3 | 45 | 0.66:100 | Caprylic Alcohol / Isopropanol / Water | 6 / 84 / 10 |

*Examples 21 to 25*

The following examples illustrate various cream or ointment protective preparations. In each instance the juglone was dissolved in either absolute ethanol or isopropanol in the stated proportion and the dihydroxyacetone was dissolved in distilled water in the proportion shown. The ointment was prepared by generally following the procedures of Example 2. Proprietary hydrophilic ointment bases were used. The results are summarized in the table:

reacting the juglone-dihydroxyacetone solution with a sulphur containing amino acid or sulphydryl containing compound in solution and emulgating with a cream base to form an ointment. In each instance, the sulphur compound was dissolved in water, the juglone was dissolved in absolute ethanol and the dihydroxyacetone was dissolved in water. The ratio of juglone to dihydroxyacetone was 1.17:100 in each instance. The examples are summarized in the table.

TABLE III

| Example No. | Juglone (Grams/Liter of Solvent) | Dihydroxy-acetone (Grams/Liter of Solvent) | Juglone/DHA Ratio | Ointment (2 Kilograms) |
|---|---|---|---|---|
| 21 | 1.4 | 120 | 1.17:100 | "Aquaphor." |
| 22 | 0.04 | 80 | 0.05:100 | Do. |
| 23 | 1.4 | 120 | 1.17:100 | "Multibase." |
| 24 | 1.4 | 120 | 1.17:100 | "Plastibase." |
| 25 | 1.4 | 120 | 1.17:100 | Polyethylene Glycol 1540, N.F. |

TABLE IV

| Example No. | Sulphur Compound (Grams/Liter of Solvent) | Juglone (Grams/Liter of Solvent) | Dihydroxy-acetone (Grams/Liter of Solvent) | Ointment (2 Kilograms) |
|---|---|---|---|---|
| 26 | Glutathione-36 | 1.4 | 120 | "Aquaphor." |
| 27 | Cystine-20 | 1.4 | 120 | "Multibase." |
| 28 | do | 1.4 | 120 | "Plastibase." |
| 29 | Methionine-20 | 1.4 | 120 | "Hydrosorb." |

*Examples 26 to 29*

A washable light shield producing ointment was prepared according to each of the following examples by

*Examples 30 to 46*

The effectiveness of the light shielding material according to the present invention was tested upon a group of seventeen persons selected for known sunburn sensitivity. The inside forearm of each person was exposed to radiation of unfiltered light from a hot quartz lamp at a distance of 22 inches for a given number of "minimal erythemal doses" (MED's), each consisting of exposure for 15 seconds. Certain areas of the skin were protected by application about 16 to 18 hours before exposure of the lotion of Example 1. For comparison, other areas of the forearm skin were left untreated. The untreated areas of the skin were exposed to the number of MED's required to produce redness. This number is indicated in column 4 of Table V. As an illustration, in Example 30, the untreated skin area was subjected to 4 MED's, or a total exposure of 60 seconds.

The treated areas were exposed to the number of MED's indicated in column 5 of Table V to the production of redness.

Where an asterisk (*) follows the number of MED's in column 4 or column 5 the exposure treatment was stopped at this number of MED's with no apparent redness having been produced. Thus, in the case of Example 46, four MED's produced redness of the untreated skin, but three times this exposure of the treated skin produced no redness and the exposure was stopped. One minimal erythemal dose (MED) is the equivalent of approximately 24 to 36 minutes exposure to direct sunlight at high noon on a summer day. In each instance, the tolerance of the person to exposure to direct sunlight was significantly increased as a result of treatment of the skin with the light shielding material according to the present invention. The results of these test exposures are summarized in the table:

Examples 47–53

To further test the effectiveness of the light shielding material according to the present invention a number of patients with known diseases with light sensitivity factor were treated with the preparations of Examples 1 and 2, both in lotion and in ointment form. These examples are summarized in Table VI which is a summary of the clinical diagnoses, the length of time the disease was present before treatment, the time the patient was treated with the protective material of this invention, the protection afforded by this material and the occurrence of previous failures with other sun protection agents.

In the instances of Examples 47, 50, 51 and 52, the patients were treated alternately with both a protective lotion and a protective ointment. In the cases of Examples 48 and 49, the initial treatment was by application of the lotion of Example 1 by spraying and subsequently by application of the ointment of Example 2. In the instance of Example 53 the treatment was by ointment only. The protection afforded is cumulative and increases with length of treatment. All of these patients are extremely sensitive to exposure to sunlight.

TABLE VI

| Example No. | Age | Sex | Diagnosis | Length of Time of Diagnosis before Treatment, yrs. | Treatment Time | Percent improvement of percent protection | Previous Protection by sun screen agents |
|---|---|---|---|---|---|---|---|
| 47 | 45 | M | Sunlight sensitivity | 10 | 1 mo | 95 | All failed. |
| 48 | 40 | M | ____do____ | 4 | 3 wks | 100 | Do. |
| 49 | 72 | F | Discoid Lupus Erythematosus. | 17 | 2 wks | 50 | Do. |
| 50 | 55 | F | Eczema with sunlight sensitivity. | 15 | 3 mos | 100 | Do. |
| 51 | 24 | F | Porphyria cutanea tarda. | 2 | 3 mos | 100 | Do. |
| 52 | 14 | F | Erythropoetic porphyria congenital. | 14 | 3 mos | 100 | Do. |
| 53 | 27 | F | Eczema with sunlight sensitivity. | 2 | 1 wk | 50 | None tried. |

As a test of the possible toxicity of the protective material of this invention, 100 milliliters of a solution prepared according to Example 1 except that ethanol was used as the solvent, was ingested by a normal adult male. No ill effects were noted immediately after ingestion or after a prolonged period of time. Two normal individuals, one male and the other female, have applied the protective preparations to their skin over prolonged periods of time without developing any primary irritant or allergic reactions.

TABLE V

| Example No. | Sex | Hair | Erythema after actual MED's on inside forearm | | Diagnosis |
|---|---|---|---|---|---|
| | | | Untreated | Treated | |
| 30 | F | Dark | 4 | 9 | Ectopic eczema with light sens. |
| 31 | M | Red | 4 | 10* | Normal. |
| 32 | M | Brown | 2 | 8 | Do. |
| 33 | M | ____do____ | 6* | 10* | Light sensitivity to I.R. |
| 34 | M | ____do____ | 2 | 10 | Normal. |
| 35 | F | Red | 1 | 6 | Do. |
| 36 | F | R. blonde | 4 | 10* | Do. |
| 37 | F | Brown | 4 | 10* | Do. |
| 38 | F | ____do____ | 2 | 4 | Pregnancy, normal. |
| 39 | M | Blonde | 2 | 10 | Normal. |
| 40 | M | ____do____ | 2 | 10* | Porphyria cutanea tarda. |
| 41 | F | Brown | 1.5 | 10* | Normal. |
| 42 | F | Red | 2 | 10* | Do. |
| 43 | F | ____do____ | 2 | 10* | Do. |
| 44 | M | Brown | 1 | 10* | Light sensitivity. |
| 45 | F | ____do____ | 4 | 10* | Lupus Erythematosus. |
| 46 | F | D. blonde | 4 | 12* | Normal. |

Examples 54 to 56

In order to evaluate the effectiveness of other quinones, preparations were made generally according to the procedures of Example 1, as follows:

TABLE VII

| Example No. | Quinone (Grams/Liter) | DHA (Grams/Liter) | Quinone/DHA Ratio | Solvent | Volume, Percent |
|---|---|---|---|---|---|
| 54 | Henna, 0.35 | 30 | 1.17:100 | Isopropanol / Water | 70 / 30 |
| 55 | Menadione, 0.35 | 30 | 1.17:100 | Isopropanol / Water | 70 / 30 |
| 56 | 8-hydroxy, 1,4-naphthoquinone, 0.35 | 30 | 1.17:100 | Isopropanol / Water | 70 / 3 |

In each instance, the preparation was applied to skin and exposed to actinic rays and, in each instance, effective protection to the skin was afforded. The color of the skin after application of these preparations, however, was less pleasing than that resulting from juglone-containing preparations. For this reason juglone is a preferred material.

Examples 57 to 68

Other light shield producing materials utilizing other carbonyl containing compounds are made generally according to the procedures of Example 1, as follows:

TABLE VIII

| Example No. | Quinone (Grams/Liter) | Carbonyl Compound (Grams/Liter) | Solvent | Volume, Percent |
|---|---|---|---|---|
| 57 | Henna, 0.35 | HMF, 30 | Ethanol / Water | 70 / 30 |
| 58 | do | Pyruvic aldehyde, 30 | Ethanol / Water | 70 / 30 |
| 59 | do | Glyceraldehyde, 30 | Ethanol / Ethyl Ether / Water | 40 / 40 / 20 |
| 60 | Menadione, 0.35 | Acetol, 30 | Isopropanol / Water | 70 / 30 |
| 61 | Menadione, 4 | HMF, 40 | Ethanol / Water | 70 / 30 |
| 62 | Juglone, 0.3 | Acetol, 30 | Isopropanol / Water | 70 / 30 |
| 63 | do | HMF, 30 | Ethanol / Water | 70 / 30 |
| 64 | 8-hydroxy-1,4-naphthoquinone, 0.35 | Glyceraldehyde, 30 | Ethanol / Ether / Water | 40 / 40 / 20 |
| 65 | Menadione, 0.35 | Pyruvic aldehyde, 30 | Ethanol / Water | 70 / 30 |
| 66 | Juglone, 0.30 | Alloxan, 30 | Ethanol / Water | 50 / 50 |
| 67 | Henna, 0.35 | do | Ethanol / Acetone / Water | 30 / 30 / 40 |
| 68 | Menadione, 0.30 | do | Isopropanol / Water | 70 / 30 |

A beneficial side effect observed as the result of application of solutions of a quinone and a carbonyl containing compound to the skin is that the mixture functions as a skin antiseptic. It functions as a bactericide or bacteriostat fixed to the skin. In this role it is useful in preparation of anatomic areas for surgery. When used in open skin sores and infected lesions and on burns the material promotes healing.

For convenience, the source of each of the exemplary proprietary cream bases is given below:

TABLE IX

"Aquaphor"—Duke Laboratories, South Norwalk, Conn.
"Multibase"—Ar-Ex Products Co., Chicago 7, Ill.
"Plastibase"—E. R. Squibb & Sons, New York, N.Y.
"Hydrosorb"—Abbott Laboratories, North Chicago, Ill.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A light shield producing material for the protection of human skin from actinic radiation of wave length between about 2900 and 26,850 angstroms which comprises a dissolved mixture of a quinone selected from the class consisting of alpha and beta tautomers of 1,4-benzo- and 1,4-naphtho-quinones and a carbonyl containing compound selected from the class consisting of dihydroxyacetone, 5-(hydroxymethyl)-2-furaldehyde, pyruvic aldehyde, glyceraldehyde, alloxan and monohydroxyacetone, said quinone and carbonyl containing compound being dissolved in a mutual non-irritating organic solvent.

2. A light shield producing material according to claim 1 further characterized in that said quinone and carbonyl containing compound are present in proportions between about 0.05:100 and 20:100.

3. A light shield producing material according to claim 1 further characterized in that said quinone is present in concentration between about 0.001% to saturation and said carbonyl containing compound is present in concentration between about 1% and saturation.

4. A light shield producing material according to claim 1 further characterized in that said material is in the form of an ointment, said dissolved mixture being emulgated in a cream base.

5. A light shield producing material for the protection of human skin from actinic radiation of wave length between about 2900 and 26,850 angstroms which comprises a dissolved mixture of a quinone selected from the group consisting of henna, menadione and juglone, and dihydroxyacetone, said quinone and dihydroxyacetone being dissolved in a mutual non-irritating organic solvent.

6. A light shield producing material for the protection of human skin from actinic burns from radiations of wave length between about 2900 and 26,850 angstroms which comprises a dissolved mixture of a quinone selected from the class consisting of henna, menadione and juglone and dihydroxyacetone in a mutual non-irritating solvent, said quinone and dihydroxyacetone being present in proportions between about 0.05:100 and 20:100, said quinone being present in concentration between about 0.001% to saturation and said dihydroxyacetone being present in concentration between about 1% and saturation.

7. A light shield producing material according to claim 6 further characterized in that said material is in the form of an ointment, said dissolved mixture being emulgated in a cream base.

8. A method for protecting human skin from actinic radiation of wave length between about 2900 and 26,850 angstroms which comprises applying to the skin a dissolved mixture of a quinone selected from the class consisting of alpha and beta tautomers of 1,4-benzo- and 1,4-naphtho-quinones and a carbonyl containing compound selected from the class consisting of dihydroxyacetone, 5-(hydroxymethyl)-2-furaldehyde, pyruvic aldehyde, glyceraldehyde, alloxan and monohydroxyacetone, said quinone and carbonyl containing compound being dissolved in a mutual non-irritating organic solvent.

9. A method according to claim 8 further characterized in that said quinone and carbonyl containing compound are present in said material in proportions between about 0.05:100 and 20:100.

10. A method according to claim 8 further characterized in that said quinone is present in concentration in said material between about 0.001% to saturation and said carbonyl containing compound is present in said material in concentration between about 1% and saturation.

11. A method according to claim 8 further characterized in that said material is applied to the skin as a solution in a plurality of at least three coatings, applied at least forty-five minutes apart, and renewed by periodic reapplications.

12. A method according to claim 8 further characterized in that said material is applied in the form of an ointment, said dissolved mixture being emulgated in a cream base.

13. A method of providing temporary protection for the protection of the human skin from radiation burns caused by radiations of wave length between about 2900 and 26,850 angstroms which comprises applying to the skin a dissolved mixture of a quinone selected from the class consisting of henna, menadione and juglone and dihydroxyacetone in a mutual non-irritating solvent.

14. A method of protecting human skin from radiation burns caused by radiations of wave length between about 2900 and 26,850 angstroms which comprises applying to the surface of the skin a dissolved mixture of a quinone selected from the class consisting of henna, menadione and juglone and dihydroxyacetone in a mutual non-irritating solvent, said quinone and dihydroxyacetone being present in proportions between about 0.05:100 and 20:100, said quinone being present in said material in concentration between about 0.001% to saturation and said dihydroxyacetone being present in said material in concentration between about 1% and saturation, said material having a pH between about 4.2 and 5; applying said material to the skin in a plurality of at least three coatings applied at least forty-five minutes apart and maintaining said protection by periodic reapplication of said material to the skin.

15. A light shield producing material for the protection of human skin from actinic radiation of wave length between about 2900 and 26,850 angstroms which comprises a dissolved mixture of a quinone selected from the class consisting of juglone, menadione, henna, 2,6-dimethoxy benzoquinone, 2,5-dimethylquinone, 2,5-dihydroxy-3-undecyl-1,4-benzoquinone, 2-hydroxy-3-methyl-1,4-naphthoquinone, 3,5,8-trihydroxy-2-methyl-1,4-naphthoquinone and 2-hydroxy-3-isobutyl-1,4-naphthoquinone and a carbonyl containing compound selected from the class consisting of dihydroxyacetone, 5-(hydroxymethyl)-2-furaldehyde, pyruvic aldehyde, glyceraldehyde, alloxan and monohydroxyacetone, said quinone and carbonyl containing compound being dissolved in a mutual non-irritating organic solvent.

16. A method for protecting human skin from actinic radiation of wave length between about 2900 and 26,850 angstroms which comprises applying to the skin a dissolved mixture of a quinone selected from the class consisting of juglone, menadione, henna, 2,6-dimethoxy benzoquinone, 2,5-dimethylquinone, 2,5-dihydroxy-3-undecyl-1,4-benzoquinone, 2-hydroxy-3-methyl-1,4-naphthoquinone, 3,5,8-trihydroxy-2-methyl-1,4-naphthoquinone and 2-hydroxy-3-isobutyl-1,4-naphthoquinone and a carbonyl containing compound selected from the class consisting of dihydroxyacetone, 5-(hydroxymethyl)-2-furaldehyde, pyruvic aldehyde, glyceraldehyde, alloxan and monohydroxyacetone, said quinone and carbonyl containing compound being dissolved in a mutual non-irritating organic solvent.

References Cited by the Examiner

Goldman, J. Soc. Cos. Chemists 12:3, April 1961, pp. 163–167.

Maibach, Arch of Derm., vol. 82, 1960, pp. 73–505—75–507.

JULIAN S. LEVITT, *Primary Examiner.*

FRANK CACCIAPAGLIA, *Examiner.*

ANNA P. FAGELSON, VERA C. CLARKE,
*Assistant Examiners.*